United States Patent [19]

Hayden et al.

[11] Patent Number: 5,061,048
[45] Date of Patent: Oct. 29, 1991

[54] APPARATUS FOR OPTICAL BEAM STEERING USING NON-LINEAR OPTICAL POLYMERS

[75] Inventors: L. M. Hayden, Lakeland; Gerald F. Sauter, Eagan, both of Minn.

[73] Assignee: Unisys Corporation, Blue Bell, Pa.

[21] Appl. No.: 475,518

[22] Filed: Feb. 6, 1990

[51] Int. Cl.[5] .............................. G02F 1/05; G02F 1/03
[52] U.S. Cl. .................................................... 359/315
[58] Field of Search .................... 350/355, 353; 357/30

[56] References Cited

U.S. PATENT DOCUMENTS

| | | | |
|---|---|---|---|
| 4,784,476 | 11/1988 | Schulman et al. | 350/355 |
| 4,790,635 | 12/1988 | Apsley | 350/355 |
| 4,947,223 | 8/1990 | Biefteld et al. | 350/355 |

OTHER PUBLICATIONS

Meyer, R. A., Optical Beam Steering Using a Multi-channel Lithium Tantalate Crystal, Applied Optics, Mar. 1972; vol. 11, No. 3, pp. 613-616.

Primary Examiner—Rolf Hille
Assistant Examiner—S. V. Clark
Attorney, Agent, or Firm—Arnold L. Albin; Glenn W. Bowen; Mark T. Starr

[57] ABSTRACT

An electro-optical light deflector utilizing layers of a non-linear electro-optically (NLO) responsive polymer for directing an exiting light beam in a given direction. Sandwiched between each NLO layer of a multi-layer array is a thin film electrically conductive layer that is connected to a voltage source. By applying an electric field across an NLO layer, a change in refractive index is induced and the phase of that portion of the optical beam passing through it is either retarded or advanced. Each layer in the NLO array sees a slightly different electric field and therefore produces a slightly different phase change in the portion of the propogating optical beam. This results in directing the reconstructed beam in a different direction. By applying different voltages to the electrodes, both beam shaping and changing beam direction are possible.

9 Claims, 2 Drawing Sheets

APPARATUS FOR OPTICAL BEAM STEERING USING NON-LINEAR OPTICAL POLYMERS

BACKGROUND OF THE INVENTION

1. Field of the Invention

The present invention pertains in general to the electro-optical art and more particularly to an apparatus utilizing non-linear optical organic polymers for applying a phase shift to deflect an optical beam.

2. Description of the Prior Art

Systems for deflecting a beam of radiant energy under the control of an electrical signal are well known in the art. For example, acousto-optical deflection systems consist essentially of a bar of elastic material whose refractive index is modulated by means of an ultrasonic wave coming from an electro-mechanical transducer affixed to one of the ends of the bar. When an electrical control signal is applied to the transducer, the refractive index of the body of the bar is caused to vary, thereby producing a phenomenon of optical refraction. By changing the frequency of the ultrasonic signal, more or less refraction may be observed in the modified direction of the reflected beam. However, typically, an acousto-optical cell has a coefficient of optical refraction such that the deflection range is limited to a few degrees. Further, such systems require a substantial amount of ultrasonic power to create in the acousto-optical cell the appropriate energy density, and complex optical systems to increase the deflection range. Typical of the acousto-optic devices is U.S. Pat. No. 4,415,226, Apparatus For Controlling Light In Electro-Optic Wave Guides With Individually Addressable Electrodes.

Beam steering based on alterable magnetic stripe domains in an epitaxial layer has been described in U.S. Pat. No. 3,752,563, Magnetic Film Stripe Domain Diffraction. In that invention, a magneto-optic light deflection system utilized the stripe domains in a magnetic film as a diffraction grating. The angle of deflection of the light from the plane of the film is varied in two dimensions by varying the separation and orientation of the stripe domains. Means are provided to vary the separation of adjacent domain walls, i.e., the width of the stripe domains, and the rotatable orientation of the parallel stripe domains. The resulting system is utilized to control, by the Kerr or Farady effect, the focus of a light beam that is directed upon the plane of the film. Magnetic stripe domain structures are operative over a limited wavelength and field of view, with an efficiency between ten and thirty percent and a divergence of the order of two milliradians. In addition to being wavelength dependent, magneto-optic deflectors have a limited response range typically of the order of 0.1 to 100 microseconds.

An electro-optical technique has been described in Optic News, April, 1989, page 34. This brief report provides little technical data and describes the use of metal-organic chemical vapor deposition techniques to grow alternating layers of compound semi-conductors such as GaAs and GaAlAs to serve as thin electro-optically active optical waveguide sandwiched between thicker electrically conducting buffer layers that are also optically transparent. Electrical connections to the buffer layers allow the variation of the time delay of the optical radiation propagating through the electro-optical guide layers. By computer controlling a large number of these time-variable optical guides, an optical phased array device was obtained for electrically scanning or positioning a laser beam.

Liquid crystal deflectors have also been applied for optical beam deflection, as in Liquid Crystal Adaptive Lens: Beam Translation and Field Meshing, Applied Optics, Vol. 27, pp. 4578-4586, Nov. 1, 1988. The article describes a design in which a parabolic voltage profile is applied to an array of interdigital electrodes on one side of a liquid crystal cell. The index of refraction of the cell is altered in a prescribed manner with the net effect that an optical beam passing therethrough is translated perpendicular to the direction of propogation.

The present invention provides an improved electro-optical deflection apparatus utilizing layers of non-linear optical organic polymers electrically controlled to form a phased array. It is operative over wavelengths from the ultraviolet to the far infra-red. Greater than ninety percent of the incoming energy is deflected. By cascading two deflectors, a field of view up to ninety degrees by ninety degrees may be obtained. Divergence is dependent on the number of NLO layers, with more layers providing less divergence. The NLO material can respond to frequencies up to $10^{15}$ Hz; therefore, the speed is determined and limited only by the control electronics.

SUMMARY OF THE INVENTION

The present invention provides an electro-optical apparatus for deflecting a beam of light energy and controlling the directions in which portions of the light energy travel under the control of an electrical signal. It comprises a plurality of voltage-controlled phase shifter elements disposed in superposed layers of non-linear optically responsive material which implement a phase gradient for producing a directive beam of light energy over a variable angle of deflection. Means are provided for directing portions of the beam light energy in a predetermined input direction into the plurality of phase shifter elements. Interposed between each of the phase shifter elements is an electrode. The index of refraction of each of the phase shifter elements is selectively changed by applying an electrical control signal between a given element and a corresponding electrode, wherein each of the electrodes is individually addressable by the control signal. Successive ones of each of the elements are disposed in close proximity, and the index of refraction in each successive layer is adjusted by the control signal so as to produce a constant difference of phase shift therebetween. The invention further provides output means for receiving portions of the beam of light energy travelling beyond the phase shifter elements in at least one predetermined output direction.

DESCRIPTION OF THE PREFERRED EMBODIMENT

Figure 1:
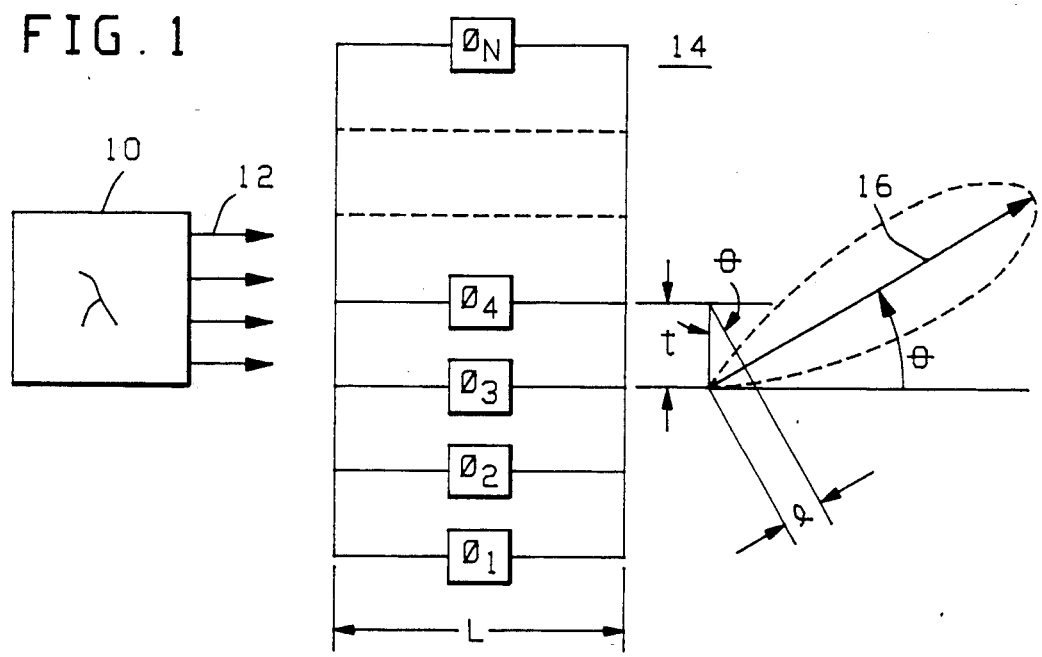
FIG. 1 is a schematic view in cross-section showing the geometrical relationships of the phase-shifted optical beam to an array of phase shift elements.

Devices for use in optical communications, such as modulators, switches, multiplexers and demultiplexers may utilize an electrically-controlled phase shifter based on the electro-optic effect. FIG. 1 is a schematic view in cross-section showing the geometrical relationships of an optical beam phase shifter comprised of an array of phase shift elements. Such an array, in its simplest form, may be used as a switching device by scanning the optical beam across a detector. The optical beam points in a direction that is normal to the phase front. In a phased array this phase front is adjusted to steer the beam by individual control of the phase of optical excitation of each phase shift element. The phase shifters are electrically actuated to permit rapid and controllable direction of scanning and are adjusted in phase to a value between 0 and $2\pi$. With a spacing between elements t, the incremental phase shift $\Delta\phi$ between adjacent elements for a deflection angle $\theta$ is $\Delta\phi = (2\pi/X)t \sin \theta$. Thus the direction in which th exiting beam points is an arc sine function of the interelement phase shift. The beam of the array may be steered to an angle $\theta_0$ by applying linearly progressive phase increments from element to element, whereby the phase between adjacent elements differs by $(2\pi t/\lambda)\sin \theta_0$. If the same electrical excitation is applied to all elements, the relative phase difference between adjacent elements is zero and the position of the optical beam will be broadside to the array at an angle $\theta = 0$. The beam will point in a direction other than broadside if the relative phase difference between elements differs from zero. The phase shifting may be electrically controlled as will be described, so that each beam position corresponds to a unique phase shift setting of the control voltages feeding the array.

The invention comprises input means 10 which may be a laser beam generator operating at a predetermined frequency which directs portions of a light beam 12 in a predetermined input direction into a module 14 which is comprised of a plurality of phase shift elements $\phi_1$, $\phi_2$, $\phi_3$, $\phi_4$, ... $\phi_M$, which are disposed in superposed layers of non-linear optically responsive material interleaved with thin film electrically conductive electrodes (not shown). Control signal means (not shown) selectively changes the index of refraction in each of the plurality of phase shifter elements by providing an electric field in each of the phase shift elements between the individually addressable electrodes. By controlling the phase gradient between the layers of non-linear optic material, a directive beam of light energy is formed over a variable angle of deflection. Successive ones of each of the elements are in close proximity, and the index of refraction in each successive layer is adjusted by the control signal means so as to produce a predetermined difference of phase shift between each layer. The output beam 16 may then be directed to an optical device such as a lens, diffraction grating or prism for receiving light energy travelling beyond the phase shifter elements in a given output direction. By applying different voltages to the electrodes, predetermined beam directions are possible.

The angle $\theta$ of the deflected beam may be determined with a knowledge of the differential phase change between the elements, the distance between elements, optical frequency and propagation distance. Thus, $$\sin \theta = l/t \tag{1}$$

where $\theta$ equals the desired deflection angle, t is the distance between the phase shift layers, and l is a parameter defined as in FIG. 1. If the differential phase change between the elements of the array is represented by $\Delta\phi$ and the wavelength of the propagating light beam by $\lambda$, then:

$$\Delta\phi/2\pi = l/\lambda \tag{2}$$

By substituting Equation (2) in Equation (1), the angle of the deflected beam is given by:

$$\sin \theta = \Delta\phi\lambda/2\pi t \tag{3}$$

The phase shift change $\Delta\phi$ experienced by the electric field after propagating through a length L is given by:

$$\Delta\phi = 2\pi L \Delta n/\lambda \tag{4}$$

where $\Delta n$ is the effective index change and is given by:

$$\Delta n = \Delta v n^3 r_{33}/3t \tag{5}$$

where $\Delta V$ is the applied voltage, n is the index of refraction of the NLO material, and $r_{33}$ is the NLO coefficient.

Organic materials have been found to be highly suitable for electro-optic devices of the type described above because of their ready processability and the large non-linearities of their organic molecules. They are essentially unlimited in frequency response, being useful in the tetraherz range. Fabrication techniques are well known and may utilize an organic guest compound dissolved in a host polymer so that a homogeneous solid solution of guest organic compound and host polymer is achieved. Illustrative of such NLO solutions is that described in U.S. Pat. No. 4,720,355, Organic Non-Linear Optical Substrates, issued Jan. 19, 1988, which is hereby incorporated by reference. In that invention, a polymerizable medium is doped with highly non-linear molecules. By appropriately heating the solution and exposing the medium to a polarizing DC electric field, alignment of the non-linear molecules may be induced in a low-viscosity state, which becomes permanent in a higher-viscosity state upon cooling of the polymer. The resulting medium possesses the non-centrosymmetric property required to exhibit the NLO electro-optic effect.

Figure 2:
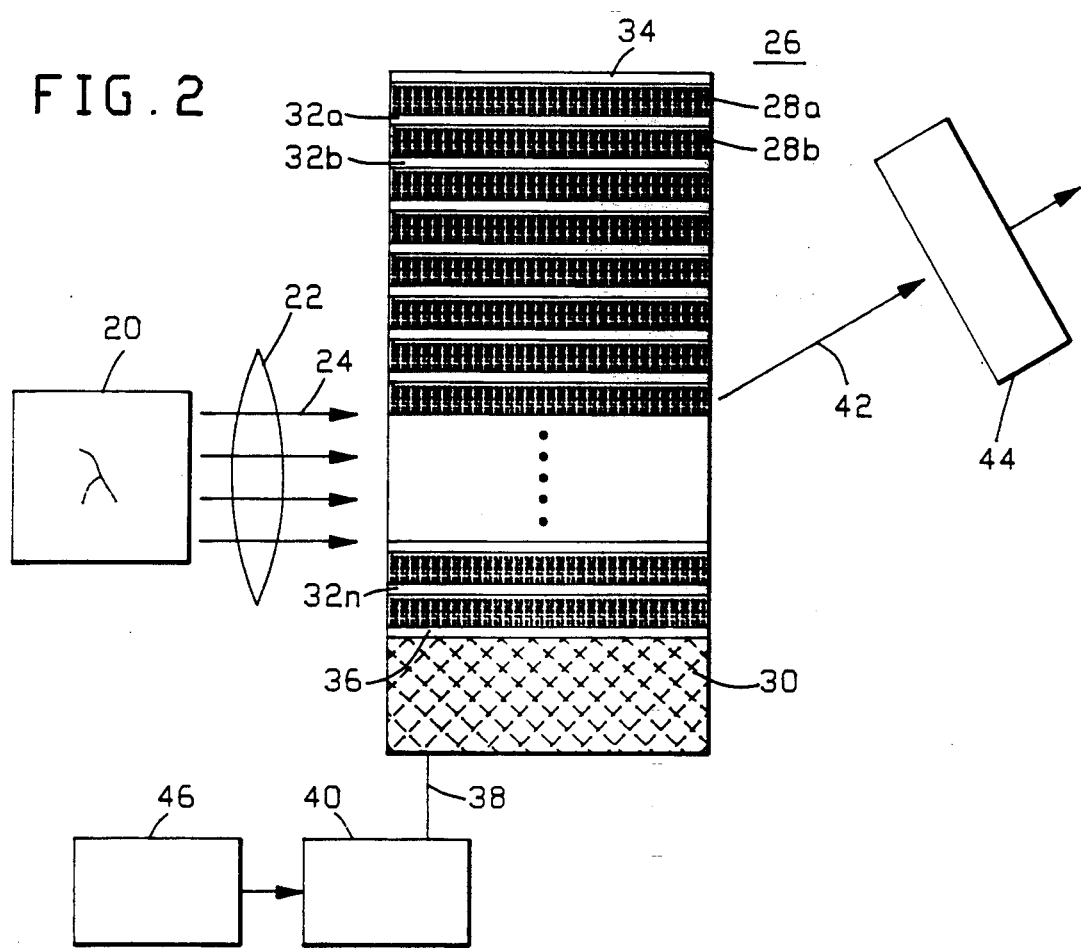
FIG. 2 is a side view in cross-section of the structure of a preferred embodiment of the invention, showing the disposition of the NLO layers and metallized electrodes for exciting the deflection elements in series.

Referring now to FIG. 2, there is shown a side view in cross-section of the structure of a preferred embodiment of the invention, showing the disposition of the optically responsive NLO layers and electrically conductive electrodes. A light source 20, which may be a multi-mode laser beam, is collimated by lens 22 to produce a collimated beam 24 for uniformly spreading the beam across the phase shifting layers of phase shifter 26. If desired, other coupling devices such as prisms or gratings may be employed to couple the beam 24 to the phase shifting aray 26. Phase shifting array 26 is comprised of a plurality of NLO layers 28a, 28b through 28n, disposed on a substrate 30. Interposed between each of the layers 28a and 28b, and between each superimposed NLO layer, are thin film electrodes 32a, 32b, through 32n. Similar electrodes 34 and 36 complete the conducting elements. Thus, each NLO layer is sandwiched between a pair of thin film conductive elements. The plurality of NLO layers and conductive layers is disposed upon the substrate 30, which may be comprised of glass, silicon, gallium arsenide or ceramic. The metal layers are preferably evaporated and photolithographically formed, although this is illustrative and not to be construed as limiting. The thickness of these layers will typically be between 0.05 and 0.1 microns. The NLO layers are spin deposited on the substrate or underlying layers and again photolithographically formed in a conventional manner well known to those skilled in the art. The thickness t is preferably of the same as the wavelength of light $\lambda$. Poling of the NLO material may be accomplished by heating the aray above its glass transition temperature (100 to 200 degree C.) while applying an electric field to each element (of the order of one megavolt/cm). With the field still applied, the stack is cooled, thus solidifying the electrical dipoles within the polymer matrix.

Each metal layer, 32a through 32n, is electrically connected through a conductor 38 to a voltage source 40. Each electrode, of course, will be individually connected to the voltage source 40 through its own conductor. Voltage source 40 may be comprised of a plurality of slightly different voltage magnitudes, thereby producing corresponding electric fields when applied to the individually addressable electrodes. By applying different voltages to the electrodes, both beam shaping and changing beam direction are possible. By applying an electric field across a NLO layer, a change in the refractive index is accomplished, and the phase of that portion of the optical beam passing through it may be either retarded or advanced. Each layer in the NLO array sees a slightly different electric field and therefore produces a slightly different phase change in the portion of the beam propagating through it. At the exit point of the stack, the optical beam reconstruct 42 directs the beam in a different direction, where it may be coupled through an output optical device 44 to a suitable receiver. Voltage source 40 may be comprised of a resistor network consisting of a series of resistors of values R, 2R, 3R ... mR (where m is the number of layers), connected between elements of the array. A sawtooth voltage 46 applied to this network would raster scan the beam in a predetermined direction.

The interstitial electrodes may also be electrically excited in parallel should the required voltage in the serial method prove to be excessive. In the parallel scheme, to be described, voltages are applied to each NLO layer individually. This arrangement will lower the overall voltage required but necessitates an additional grounded metal film layer and insulating layer for each NLO element of the array. Further flexibility may be obtained by energizing the individual layers through a computer-controlled voltage source 46, which can be used to shape the beam as well as cause a predetermined deflection.

Figure 3:
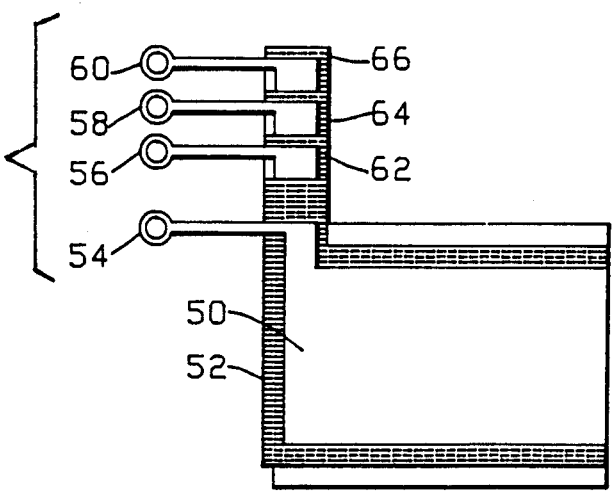
FIG. 3 is a plan view of the invention, showing how interconnections are made to provide a control voltage.

FIG. 3 shows in plan view how interconnections may be made to provide the control voltage. A thin metallized conductive film 50 is deposited on an NLO layer 52 and coupled through a lead 54 to an energizing voltage source (not shown) which may be the voltage source 40 of FIG. 2. Leads 56, 58 and 60 are similarly coupled to conductive layers interposed between NLO layers 62, 64 and 66, respectively. For simplicity of illustration, only a limited number of conductive layers and NLO layers are shown, but clearly, additional layers may be provided in a similar fashion.

Figure 4:
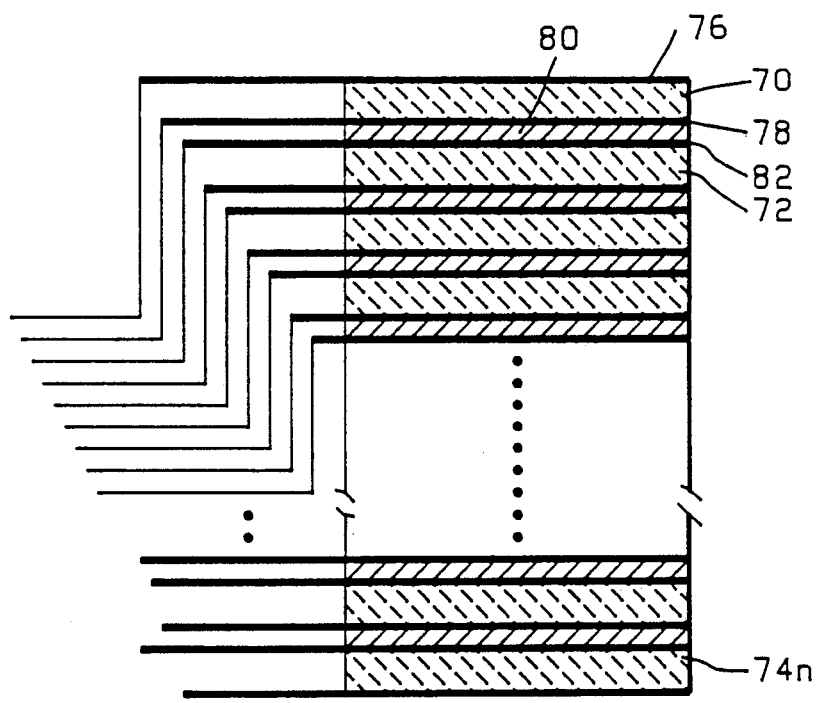
FIG. 4 is a side view in cross-section of a further embodiment of the invention for exciting the conductive elements independently and in parallel.

Referring now to FIG. 4, a further embodiment of the invention for exciting the elements independently, as in the parallel method, is shown. Each NLO layer 70, 72, 74m is disposed between a pair of conducting film elements. Thus, NLO layer 70 had deposited thereupon a first conductive layer 76 and a second conductive layer 78. Between NLO layer 72 and conductive layer 78 is an insulating layer 80 and a second conductive layer 82. Thus, each NLO layer is disposed between a pair of parallel electrodes for providing flexibility in excitation. By this configuration, the metal film electrodes may be connected in series or parallel arrangements to afford great flexibility in application.

Figure 5:
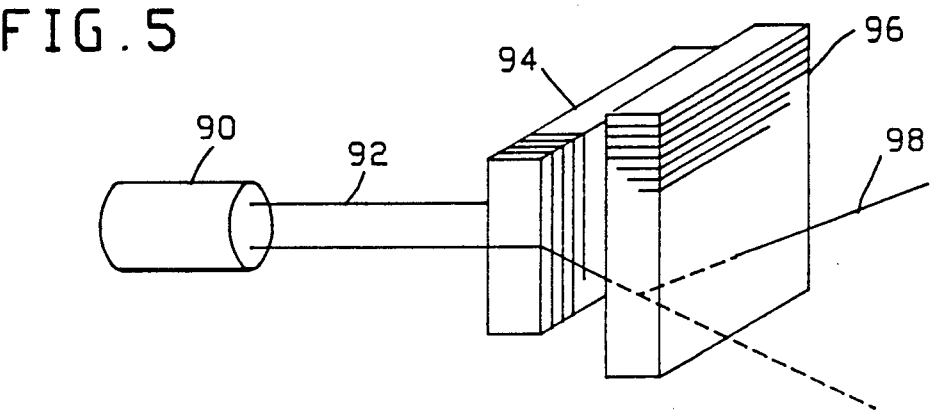
FIG. 5 is a conceptual view of an X-Y optical deflector formed by cascading two deflecting arrays disposed orthogonally.

FIG. 5 shows how an X-Y deflector may be produced by cascading two orthogonal phase shifter arrays. A light source 90 provides a collimated beam 92 which is directed upon a first array 94. Array 94 is oriented to direct the phase shifted beam along the horizontal axis. The phase shifted beam exiting phase shifter 94 is then directed to a second phase shifter 96, which is oriented orthogonally to phase shifter 94 so that the exiting beam 98 is further shifted in a vertical plane.

It may be seen that the present invention offers the following advantages over the prior art:

1. The operating wavelength is from the ultraviolet to the far infrared wavelengths.

2. It is highly efficient, providing deflection of greater than ninety percent of the incoming optical energy.

3. A field of deflection of 90×90 degrees can be obtained with two cascaded deflectors.

4. The multiple layer structure reduces the divergence of the beam.

5. The NLO material can respond to frequencies up to $10^{15}$ Hz; therefore, the speed of response is determined and limited only by the associated control electronics.

As an example of the operation of the invention, we will compute the required exciting voltage for a desired deflection angle of 30 degrees. Assume a stack of twenty NLO elements. The index of refraction is given as 1.6, and the NLO coefficient $r_{33}$ equals $100 \times 10^{-12}$ meters per volt. (Materials with even greater coefficients have been reported in the literature.) The length of the deflector stack, L, is 1 cm. The thickness t of each phase shift element equals the wavelength $\lambda$ which is selected at 1 micron. The desired deflection angle of 30 degrees requires a differential phase change in each element of $\pi$ radians. Substituting these numbers in the above equations yields a required control signal of 0.366 volts across the first phase shift element and a control signal of 7.32 volts across the 20th element. In the serial mode, the total voltage across the stack would thus be 76.86 volts. In the parallel structure, the highest voltage would be 7.32 volts.

It should be noted that if a ceramic substrate is used, then the resistor network that is used to couple electrical control signals to the phase shifter elements could be incorporated by conventional film deposition and easily trimmed as necessary. If a semiconductive substrate such as GaAs is used, then a laser diode could be integrated into the deflector. Further, each of the deflector items, such as the input and output optical couplers, laser diode, phased array, and electronic components, could also be batch fabricated and assembled on a hybrid module.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An electro-optical deflection system for deflecting a beam of light energy and controlling the directions in which portions of the light energy travel under the control of an electrical signal, comprising:
    a plurality of voltage-controlled phase shifter elements disposed in superposed layers of non-linear optically responsive material which implement a phase gradient for providing a directive beam of light energy over a variable angle of deflection;
    input means for directing portions of said beam of light energy in a predetermined input direction into said plurality of phase shifter elements;
    control signal means for selectively changing the index of refraction in each of said plurality of phase shifter elements by providing an electric field in ones of said elements between a plurality of individually addressable electrodes therebetween;
    successive ones of said elements being in close proximity and the index of refraction in each successive element being adjusted by said control signal means so as to produce a predetermined difference of phase shift therebetween; and
    output means for receiving portions of said beam of light energy travelling beyond said phase shifter elements in at least one predetermined output direction.

2. An electro-optical deflection system as set forth in claim 1 wherein each of said plurality of phase shifter elements is comprised of a planar layer of nonlinear electrically optically responsive material and said addressable electrodes comprise first and second layers of electrically conductive material disposed on opposing surfaces of said planar layer.

3. An electro-optical deflection system as set forth in claim 2, wherein one of said electrically conductive layers is further disposed upon an inert substrate.

4. An electro-optical deflection system as set forth in claim 3, wherein one of said electrically conductive layers is further disposed upon a semiconductive substrate.

5. An electro-optical system as set forth in claim 4, further comprising signal means for providing an electrical control signal, said signal means coupled to energize said conductive layers in a predetermined distribution such that said index of refraction is varied in accordance with said predetermined output direction of said beam of light energy.

6. An electro-optical system as set forth in claim 5, wherein each of said conductive layers is equipotentially energized, and ones of said layers are sequentially connected in electrical series.

7. An electro-optical system as set forth in claim 5, wherein ones of said plurality of phase shifter elements are further comprised of an insulating layer and a further layer of electrically conductive material, such that predetermined ones of said phase shifter elements are comprised of a planar layer of non-linear electro-optically responsive material bounded on opposing sides by layers of said electrically conductive material, and sequential phase shifter elements are electrically insulated from each other by one of a plurality of insulating layers.

8. An electro-optical system as set forth in claim 7, wherein each of said phase shifter elements has first and second layers of electrically conductive, optically transmissive material disposed thereon and corresponding first and second electrically conductive layers of each phase shifter element are electrically connected in parallel.

9. An electro-optical system as set forth in claim 2, further comprising first and second arrays of phase shifter elements disposed for sequential deflection of said beam of light energy in first and second directions so that said beam may be deflected anywhere in a plane broadside to an angle of incidence of said beam of light energy.

* * * * *